United States Patent
Scannell et al.

(10) Patent No.: US 10,669,038 B2
(45) Date of Patent: Jun. 2, 2020

(54) ENGINE INLET SYSTEM WITH INTEGRAL FIREWALL SEAL

(71) Applicant: Textron Innovations Inc., Fort Worth, TX (US)

(72) Inventors: Brent Scannell, L'ile-Bizard (CA); Thomas Mast, Carrollton, TX (US)

(73) Assignee: TEXTRON INNOVATIONS INC., Fort Worth, TX (US)

(*) Notice: Subject to any disclaimer, the term of this patent is extended or adjusted under 35 U.S.C. 154(b) by 211 days.

(21) Appl. No.: 15/958,277

(22) Filed: Apr. 20, 2018

(65) Prior Publication Data
US 2019/0322383 A1 Oct. 24, 2019

(51) Int. Cl.
| B64D 45/00 | (2006.01) |
| A62C 2/06 | (2006.01) |
| A62C 3/08 | (2006.01) |
| B64D 27/02 | (2006.01) |
| B64D 33/02 | (2006.01) |

(52) U.S. Cl.
CPC .............. *B64D 45/00* (2013.01); *A62C 2/06* (2013.01); *A62C 3/08* (2013.01); *B64D 27/02* (2013.01); *B64D 33/02* (2013.01); *B64D 2033/0253* (2013.01); *B64D 2045/009* (2013.01)

(58) Field of Classification Search
CPC ........... B64D 33/02; B64C 1/10; B64C 27/12; B64C 29/0033
See application file for complete search history.

(56) References Cited

U.S. PATENT DOCUMENTS

| 3,744,743 | A | * | 7/1973 | Nay | ........................ | B64C 27/12 244/17.11 |
| 8,998,130 | B2 | | 4/2015 | Dailey et al. | | |
| 9,586,692 | B2 | * | 3/2017 | Bofill | ..................... | B64D 33/02 |
| 2013/0087663 | A1 | * | 4/2013 | Dailey | ................... | B64D 33/02 244/53 B |
| 2018/0043986 | A1 | * | 2/2018 | Miller | ....................... | B64C 7/02 |
| 2019/0003430 | A1 | * | 1/2019 | Dionne | ..................... | F01P 7/14 |

OTHER PUBLICATIONS

EPO Examination Report for EP Application No. 18182088.7 dated Nov. 30, 2018, 6 pages.
EPO Search Report for EP Application No. 18182088.7 dated Nov. 16, 2018, 4 pages.

* cited by examiner

*Primary Examiner* — Justin M Benedik
(74) *Attorney, Agent, or Firm* — Patent Capital Group

(57) ABSTRACT

One embodiment is an inlet plenum assembly for a rotary aircraft that includes an inlet plenum defined on a first side by an inlet plenum wall and on a second side by a forward firewall assembly, the forward firewall assembly having an inlet aperture configured to receive a drive shaft to rotatably coupled to an engine; and a seal connected to the forward firewall assembly via a seal retainer disposed around a periphery of the inlet aperture. The forward firewall assembly may further include a forward firewall upper portion and a forward firewall lower portion, the forward firewall upper portion configured to removably seat to the forward firewall lower portion. The seal retainer may be attached to the forward firewall assembly via a plurality of bolts disposed around the periphery of the seal retainer. In some embodiments, the seal is connected to an inlet duct of the engine.

18 Claims, 10 Drawing Sheets

ENGINE INLET SYSTEM WITH INTEGRAL FIREWALL SEAL

TECHNICAL FIELD

This disclosure relates generally to rotorcraft and, more particularly, to an engine inlet system having an integral firewall seal for having specific application in such rotorcraft.

BACKGROUND

Rotary aircraft (or rotorcraft), such as helicopters and tilt wing aircraft, operate using internal combustion engines. Two common features of internal combustion engines are that they include air intakes, which provide oxygen for combustion, and that they operate at very high temperatures. Because of the high temperatures and risk of fire in a vehicle powered by an internal combustion engine, such vehicles may include a firewall that provides a physical fire barrier between the engine compartment and other portions of the vehicle that may be affected by fire.

SUMMARY

One embodiment is an inlet plenum assembly for a rotary aircraft that includes an inlet plenum defined on a first side by an inlet plenum wall and on a second side by a forward firewall assembly, the forward firewall assembly having an inlet aperture configured to receive a drive shaft to rotatably coupled to an engine; and a seal connected to the forward firewall assembly via a seal retainer disposed around a periphery of the inlet aperture. The forward firewall assembly may further include a forward firewall upper portion and a forward firewall lower portion, the forward firewall upper portion configured to removably seat to the forward firewall lower portion. The seal retainer may be attached to the forward firewall assembly via a plurality of bolts disposed around the periphery of the seal retainer. In some embodiments, the seal is connected to an inlet duct of the engine. The engine inlet duct may include a bellmouth.

In some embodiments, the engine inlet duct includes an integral flange feature to which the seal is connected. The seal may be connected to the integral flange feature via a seal retainer attached to the integral flange feature via a plurality of bolts disposed around a periphery of the integral flange feature. The diameter of the inlet aperture may be greater than a diameter of the engine inlet duct to provide a radial clearance between the engine and the firewall assembly. In certain embodiments, a side of the seal to which the engine is attached and a side of the seal opposite the side of the seal to which the engine is attached are offset from one another to accommodate radial and axial movement of the engine relative to an airframe in which the engine is disposed. The seal may be constructed of a flexible fireproof material.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
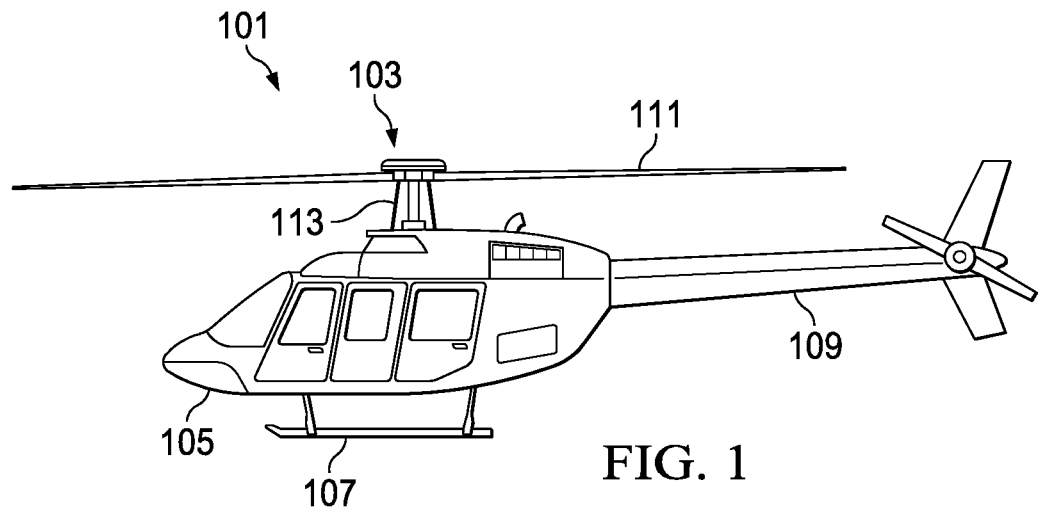
FIGS. 1 and 2 illustrate example aircraft in accordance with certain embodiments.

In certain rotary aircraft, an inlet plenum assembly is defined, which may comprise a compartment defined on one side by an inlet plenum wall, and on the other side by a firewall. In some cases, the inlet plenum assembly includes a drive shaft assembly, and a reduction gearbox ("RGB"). The drive shaft may pass through an inlet aperture which provides air intake. In this configuration, removal of the engine or any of the other gearbox/drivetrain components for servicing can be difficult because the forward firewall and inlet plenum wall form a barrier.

However, in certain embodiments of the present disclosure, a novel inlet plenum assembly is described, in which the inlet plenum wall and firewall each comprise a two-piece assembly, which may include, for example, a lower portion, or "lower," that remains affixed to the aircraft, and which is removably attached to a removable upper portion, or "upper." Thus, when the engine is to be serviced, the removable upper portions may be detached from the fixed lower portions and the engine can then be removed with the driveshaft and RGB as a complete assembly.

Additionally, a flexible fireproof seal component accommodates engine movement relative to the inlet plenum wall and firewall and the engine inlet duct, which may be implemented as a bellmouth, has an integral flange feature that connects directly to the engine interface and creates an air path to the inlet plenum.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom' or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

FIG. 1 illustrates an example embodiment of a rotorcraft 101. The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105, a tail rotor or anti-torque system, an empennage, and a tail structure 109. In the illustrated embodiment, tail structure 109 may be used as a horizontal stabilizer. Torque is supplied to rotor system 113 and the anti-torque system using at least one engine.

Figure 2:
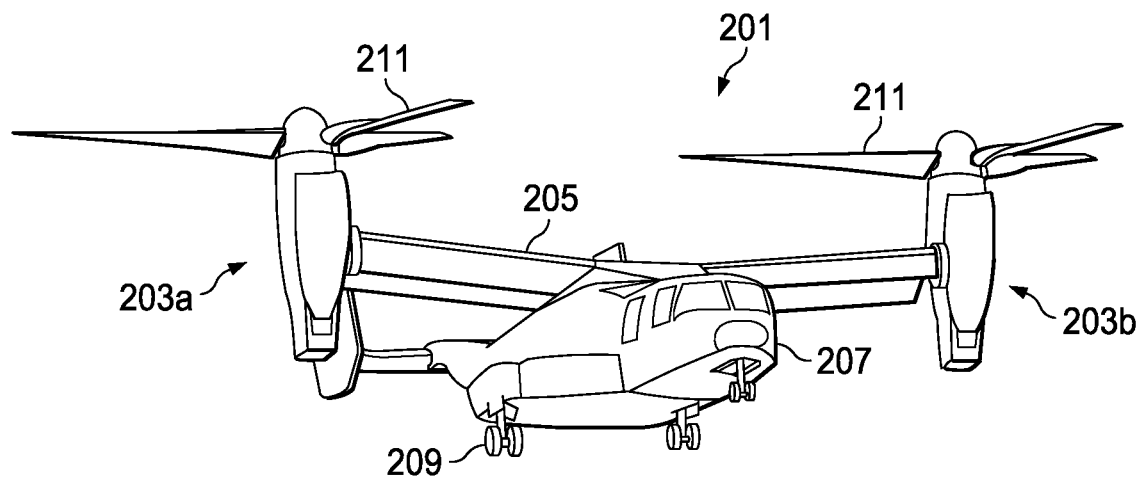

FIG. 2 illustrates a perspective view of an example tiltrotor aircraft 201. Tiltrotor aircraft 201 includes nacelles 203a and 203b, a wing 205, a fuselage 207, and a tail structure. Nacelles 203a and 203b respectively include rotor systems, and each rotor system includes a plurality of rotor blades 211. Moreover, each nacelle 203a and 203b may include an engine and gearbox for driving each rotor system, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, the tail structure may be used as a vertical stabilizer.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Figure 3:
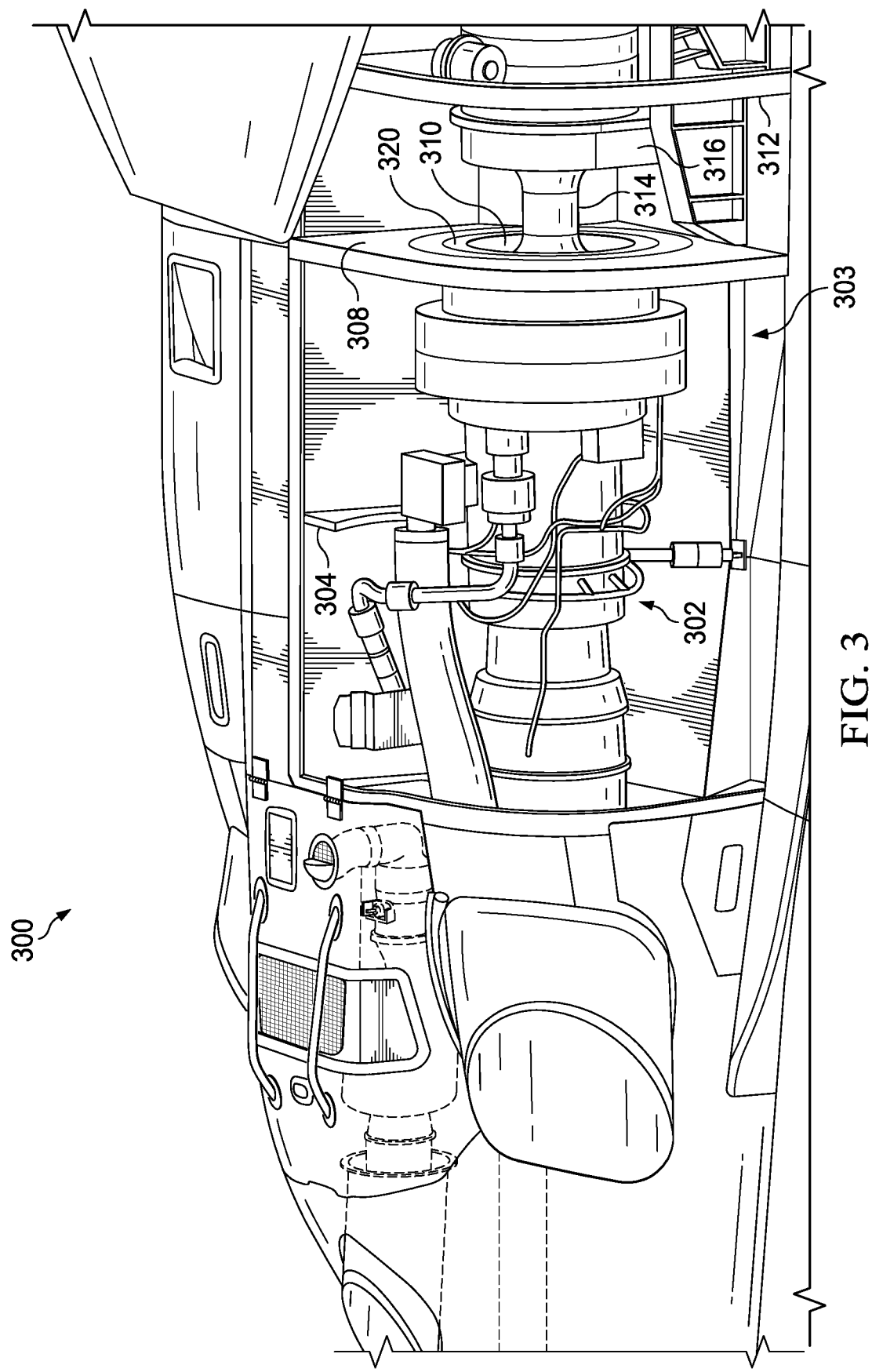
FIG. 3 is a cutaway side view illustration of selected elements of a rotary aircraft engine according to one or more examples of the present specification.

FIG. 3 is a cutaway side view illustration of a portion of a rotorcraft 300 showing selected elements of a rotary aircraft engine 302 according to one or more examples of the present specification. In this example, the rotary aircraft engine 302 is encased within an engine compartment 303. As an internal combustion engine, rotary aircraft engine 302 runs at high temperatures and thus requires fire protection. Thus, two firewalls are provided, including a center firewall 304, and a forward firewall 308.

Rotary aircraft engine 302 also requires combustible air to operate. Thus, an inlet plenum is provided, including the forward firewall 308 with an inlet aperture 310. Inlet aperture 310 allows air to pass through to engine 302.

The inlet plenum is defined by a forward firewall 308 and inlet plenum wall 312. Driveshaft assembly 314 passes through inlet aperture 310 and ultimately operates the rotors of the rotary aircraft. A reduction gearbox assembly (RGB) 316 provides reduction gearing to driveshaft assembly 314. In accordance with features of embodiments described herein, a flexible seal component 320 is provided to accommodate movement of engine 302 relative to forward firewall 308. In certain existing aircraft designs, because driveshaft assembly 314 passes through inlet aperture 310, removal of the engine for servicing may require partial disassembly, such as disengaging driveshaft 314 and RGB 316 from engine 302.

However, as described herein, embodiments of the present disclosure provide a forward firewall 308 and inlet plenum wall 312 that include removable upper portions. The removable upper portion of the inlet plenum wall 312 enables the engine, driveshaft, and RGB to be removed as a single assembled unit, thus saving disassembly/reassembly time.

Figure 4A:
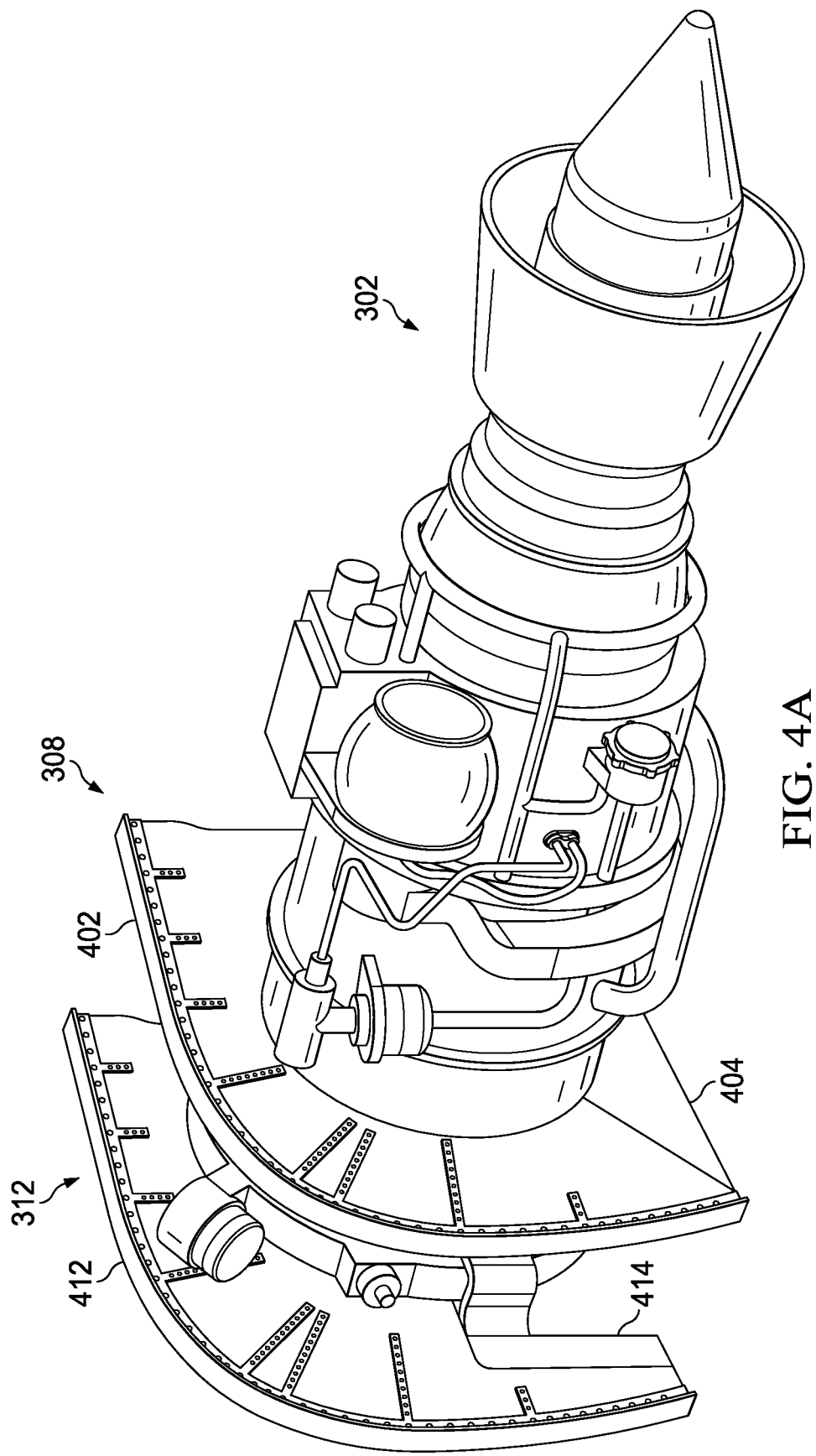
FIG. 4A is a perspective view of selected components according to one or more examples of the present specification.
Figure 4B:
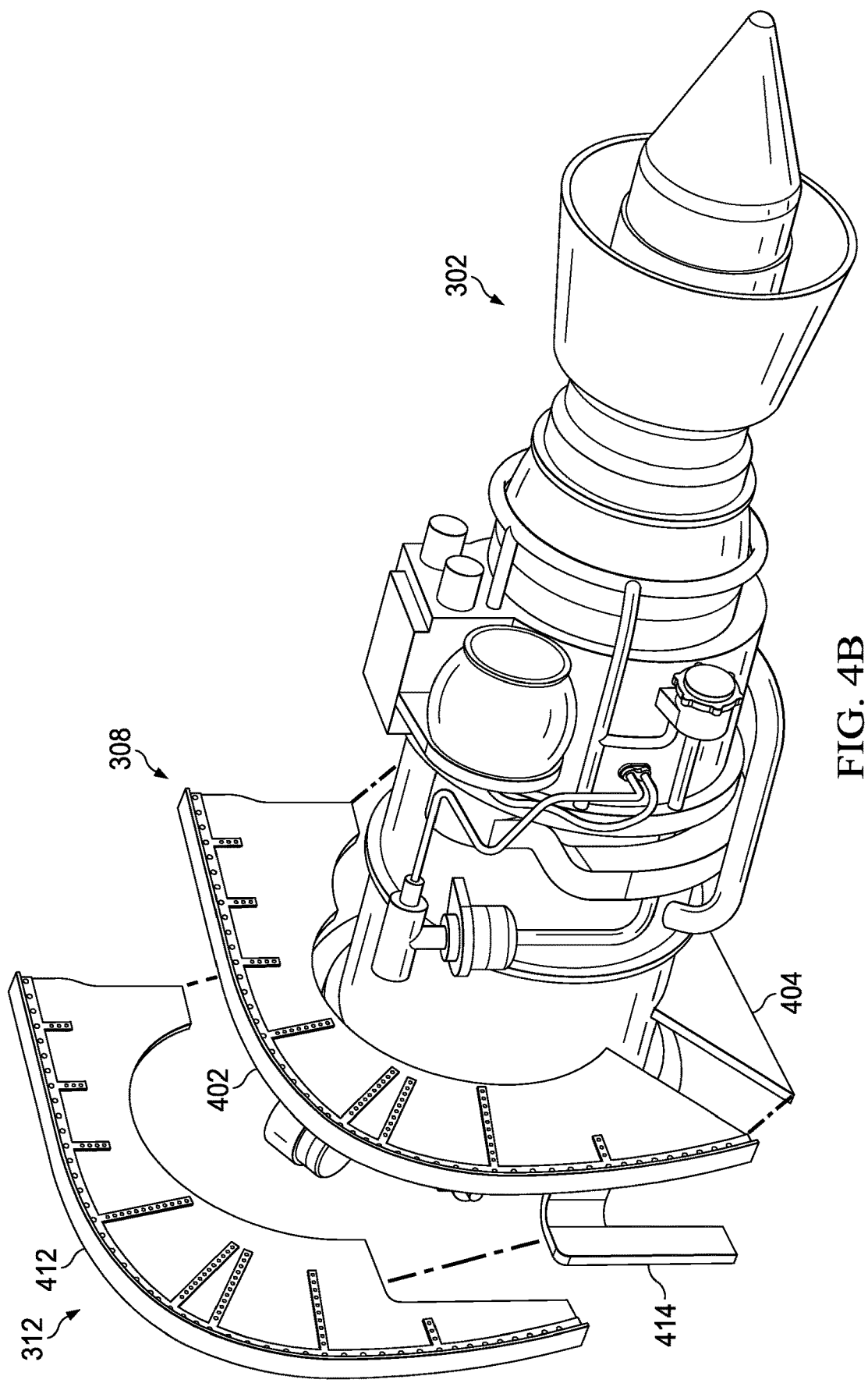
FIG. 4B is a further perspective view of selected components according to one or more examples of the present specification.

FIGS. 4A and 4B are perspective views of selected components illustrating certain features of the present specification.

Visible in FIG. 4A is engine 302, including an inlet plenum wall 312 and forward firewall 308, defining an inlet plenum assembly. In this example, forward firewall 308 includes a forward firewall upper portion 402, and a forward firewall lower portion 404. Forward firewall upper portion 402 may be removable from forward firewall lower portion 404, thus enabling easier disengagement of engine 302. In certain embodiments, forward firewall lower portion 404 may be affixed to the aircraft structure or chassis, such as by welding, rivets, bolting, or other secure and relatively permanent affixing means. Forward firewall upper portion 402 may be removably attached to forward firewall lower portion 404. Thus, when it is necessary to service engine 302, forward firewall upper portion 402 can be detached from forward firewall lower portion 404, facilitating easier removal of engine 302.

Similarly, inlet plenum wall 312 may include an inlet plenum wall upper portion 412 and an inlet plenum wall lower portion 414. As with forward firewall lower portion 404, inlet plenum wall lower portion 414 may be relatively permanently attached to the aircraft chassis, such as via welding, rivets, bolts, or other means. Inlet plenum wall upper portion 412 may be removably attached to inlet plenum wall lower portion 414, so that when it is necessary to service RGB 316, inlet plenum wall upper portion 412 can be detached, thus facilitating easier removal of RGB 316.

FIG. 4B illustrates an example wherein inlet plenum wall upper portion 412 and forward firewall upper portion 402 are removed from their respective lower portions, inlet plenum wall lower portion 414 and forward firewall lower portion 404 for servicing of engine 302. It should be noted that removing both upper portion components provides for easier access, replacement, and/or servicing of the assembled and intact engine 302, RGB 316, and driveshaft assembly 314. As can be seen in this illustration, with the two upper portions 402 and 412 removed, engine and assembled driveshaft and RGB can be relatively easily lifted out without obstruction.

Figure 5A:
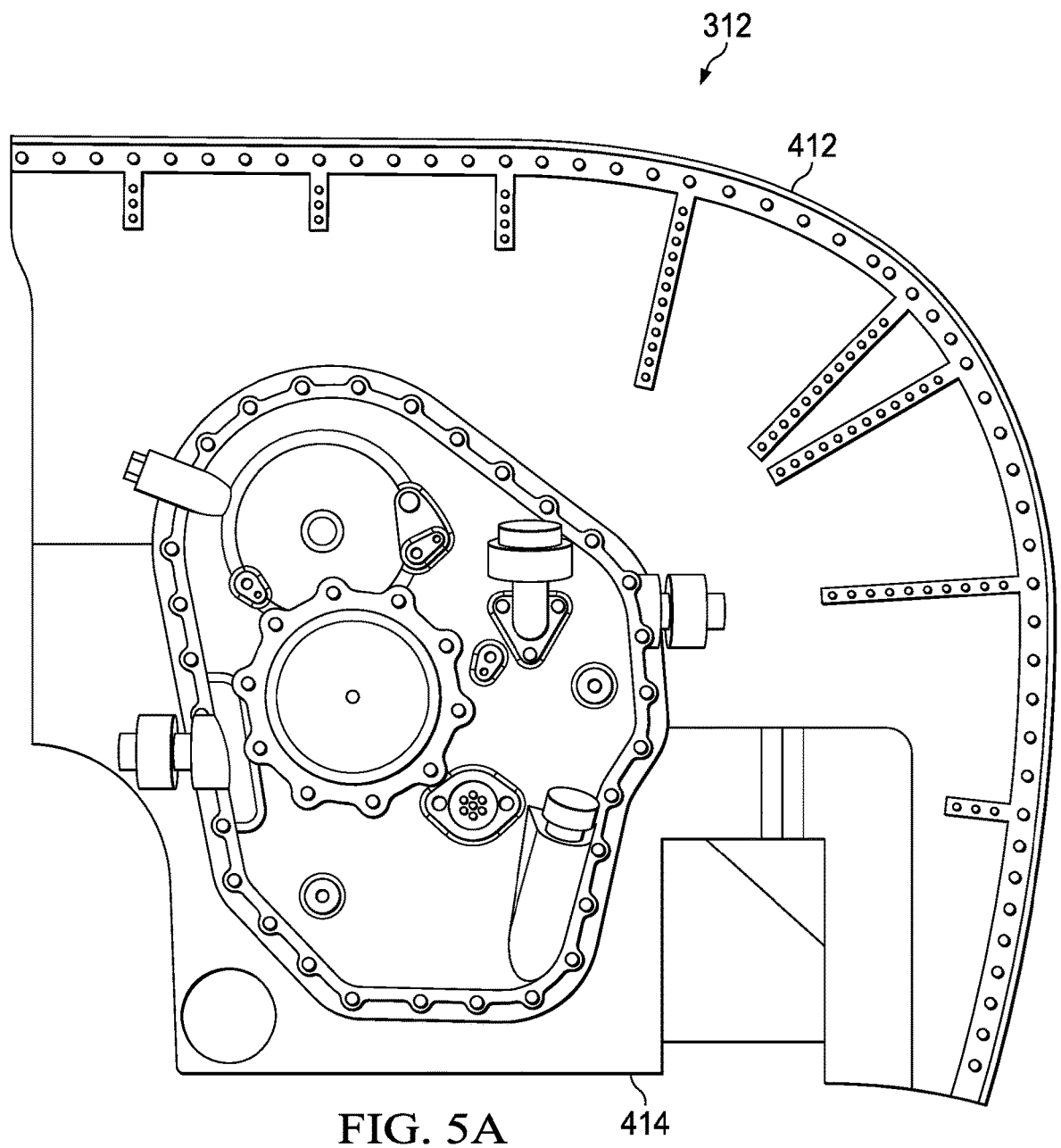
FIG. 5A is a front view of an inlet plenum wall according to one or more examples of the present specification.
Figure 5B:
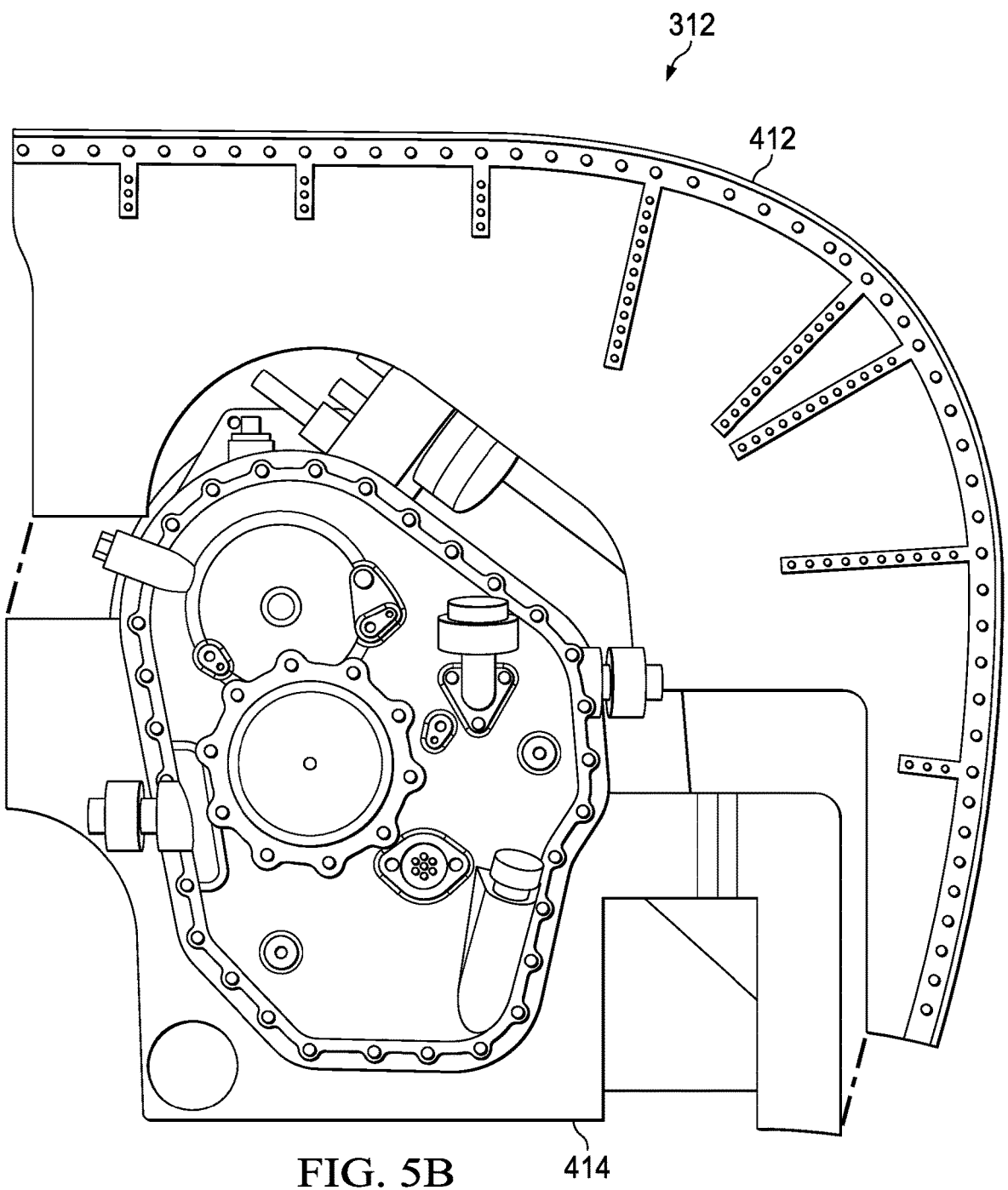
FIG. 5B is a further front view of an inlet plenum wall according to one or more examples of the present specification.

FIGS. 5A and 5B are a front view of inlet plenum wall 312 illustrating the same principles as disclosed in FIGS. 4A and 4B. As seen in this view, inlet plenum wall 312 includes an inlet plenum wall lower portion 414 and an inlet plenum wall upper portion 412. As illustrated in FIG. 5B, inlet plenum wall upper portion 412 may be detached from inlet plenum wall lower portion 414.

Figure 6:
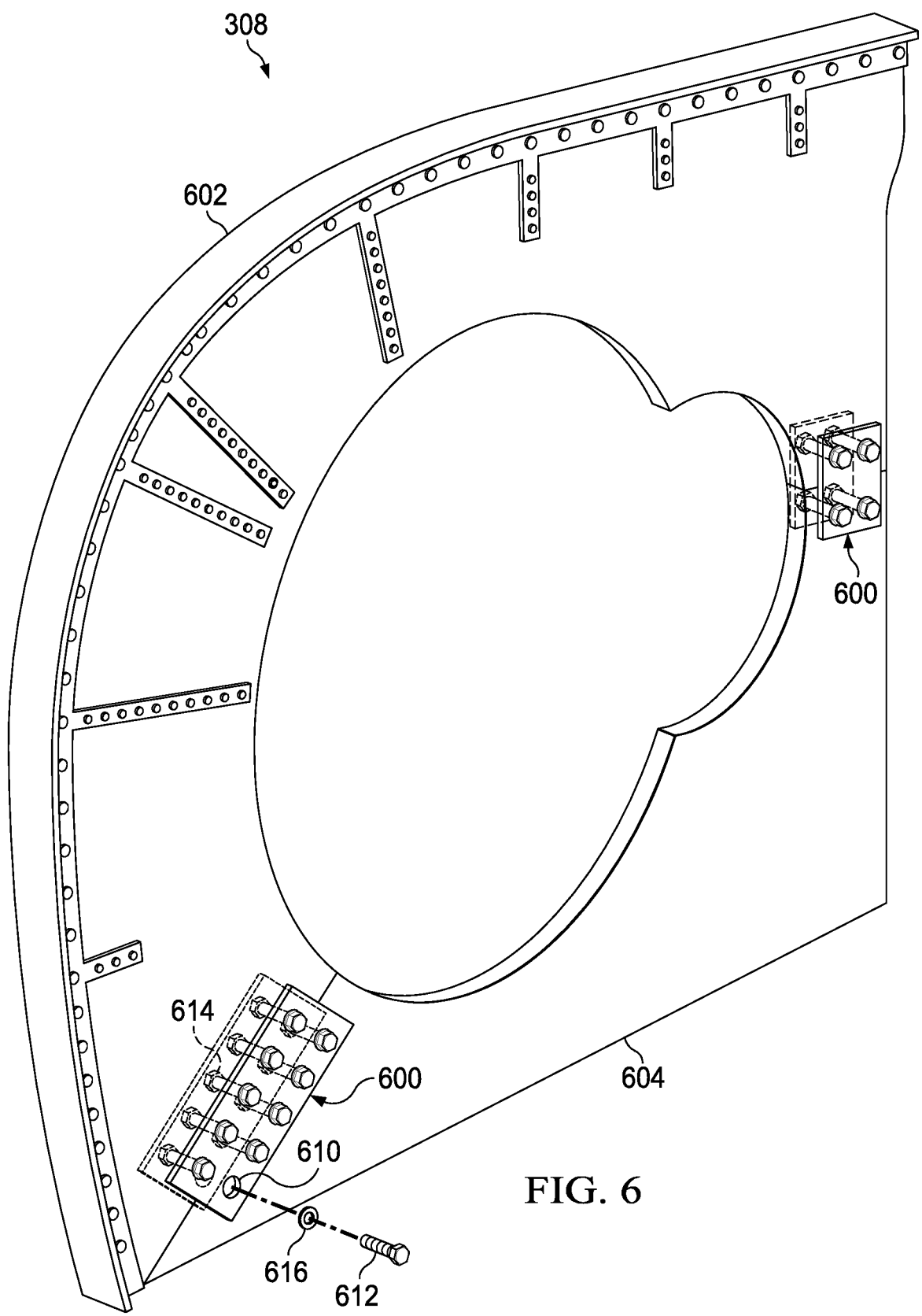
FIGS. 6 and 7 illustrate embodiments of mechanically coupling an upper portion to a lower portion according to one or more examples of the present specification.
Figure 7:
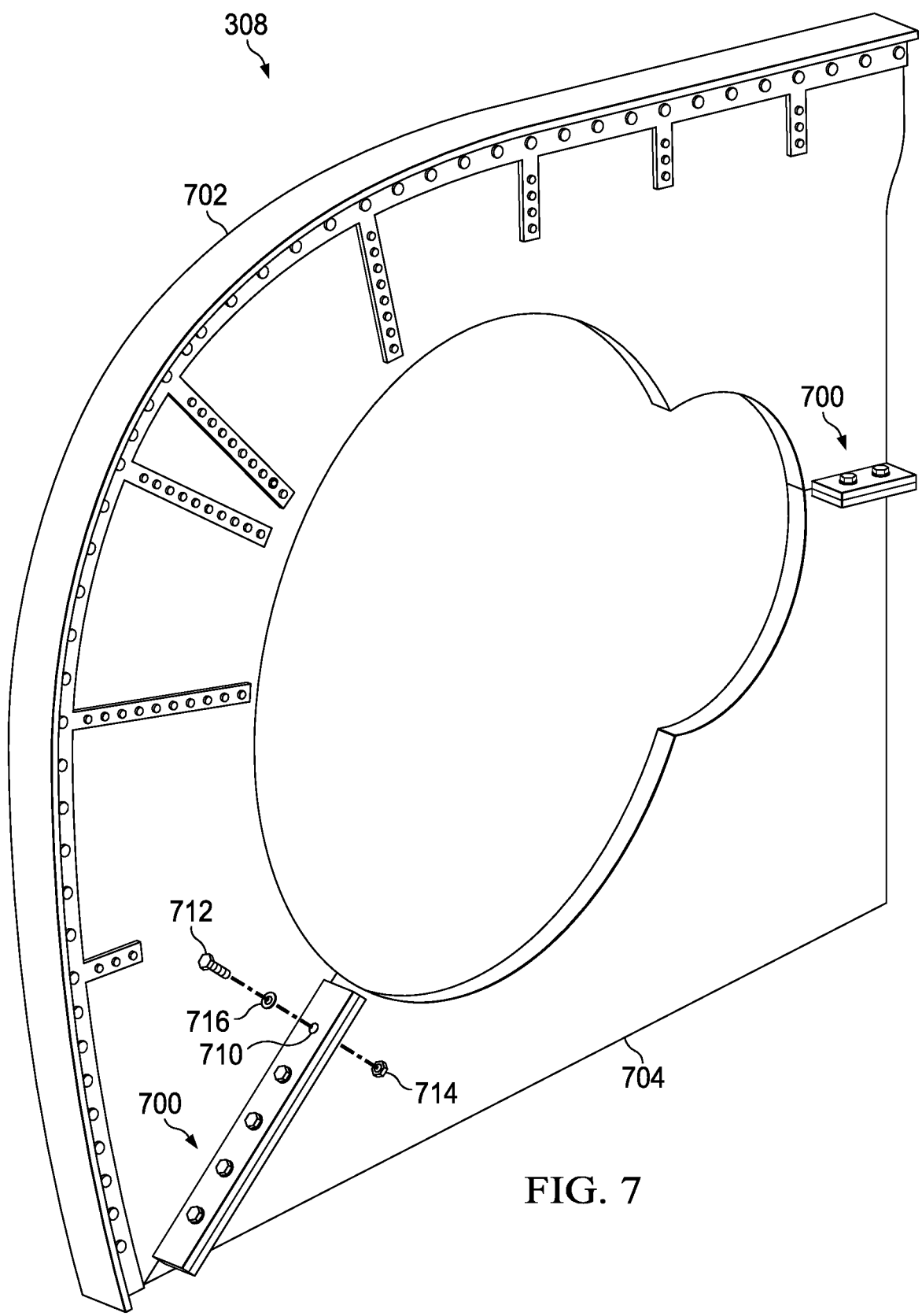

FIGS. 6 and 7 illustrate embodiments of mechanically coupling an upper portion to a lower portion according to one or more examples of the present specification.

FIG. 6 is a detail perspective view of selected components of the present specification. In certain embodiments, a mounting plate 600 may be provided at the mechanical interface between an upper portion 602 and a lower portion 604. Upper portion 602 may refer to either forward firewall upper portion 402 or inlet plenum wall upper portion 412. Lower portion 604 may refer to either forward firewall lower portion 404 or inlet plenum wall lower portion 414. Mounting plate 600 may be affixed parallel to its respective wall, and in certain embodiments, a mirrored mounting plate 600 may be affixed opposite to the first mounting plate 600. Mounting plate 600 may provide through holes 610, through which bolts 612 may be inserted, secured by nuts 614 and washers 616. Note that bolts 612 are disclosed by way of nonlimiting example only, and other appropriate fastening means may be used FIG. 7 is a detail perspective view of selected components of the present specification. In certain embodiments, a mounting flange 700 may be provided at the mechanical interface between an upper portion 702 and a lower portion 704. Upper portion 702 may refer to either forward firewall upper portion 402 or inlet plenum wall upper portion 412. Lower portion 704 may refer to either forward firewall lower portion 404, or inlet plenum wall lower portion 414. Mounting flange 700 may include a protrusion orthogonal to the plane of the respective wall. Mounting flange 700 may provide through holes 710, through which bolts 712 may be inserted, secured by nuts 714 and washers 716. Note that bolts 712 are disclosed by way of nonlimiting example only, and other appropriate fastening means may be used.

In one or more embodiments, upper portion 702 and lower portion 704 may be configured so that mounting flanges 700 form an "L" shape relative to their respective walls. The legs of the two "L" shapes abut one another, and fasteners secure the two L's together. In one embodiment, the legs of the L's are disposed to be away from and outside of the actual inlet plenum assembly. This provides safety from "foreign object debris" (FOD) to the engine. Because the L's are oriented away from the inlet plenum assembly, if a fastener becomes dislodged, it does not fall into the inlet plenum compartment (which could expose the engine air inlet to risk of ingesting the aforementioned hardware). Rather, it may simply fall to the frame where it can safely be retrieved later.

Figure 8:
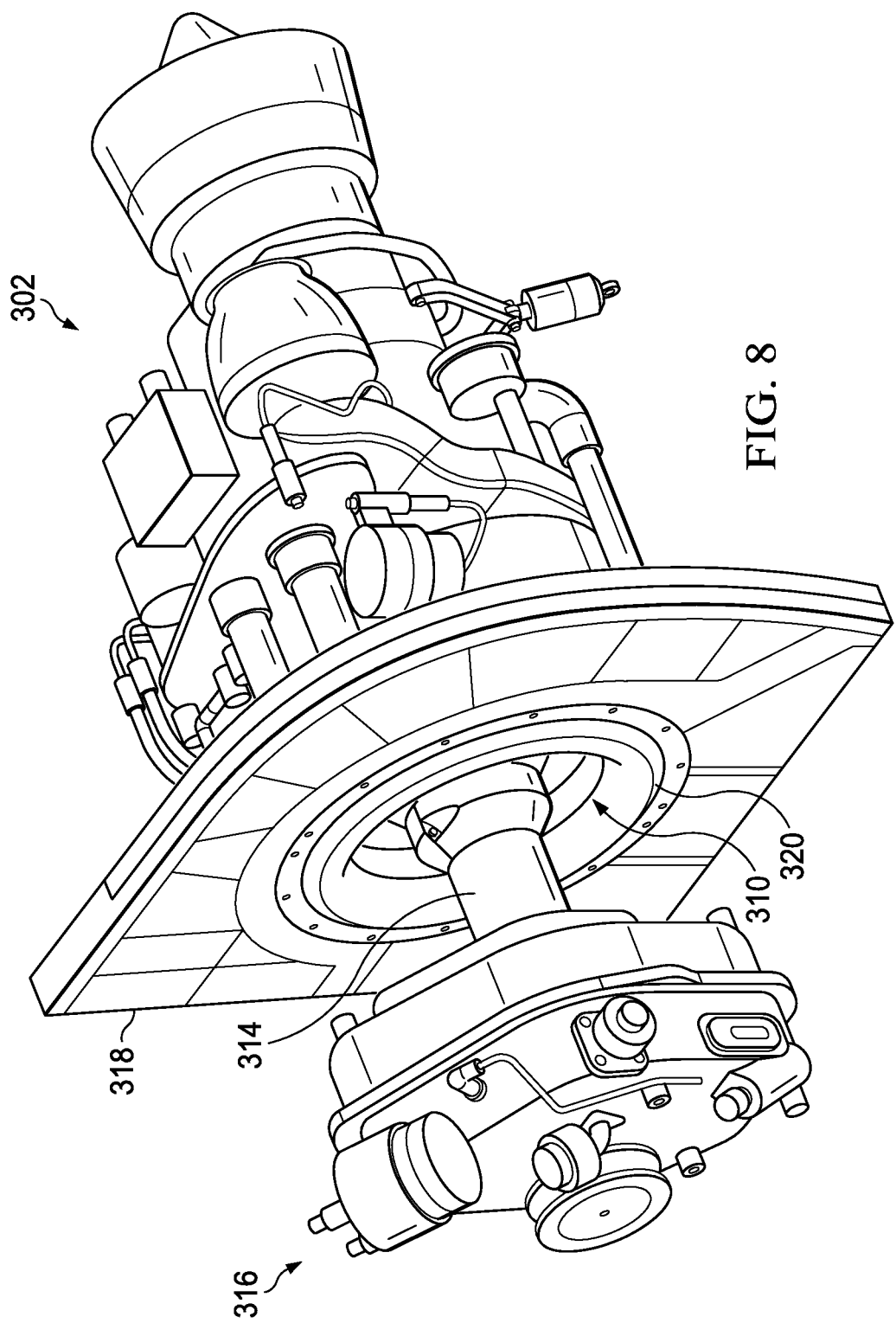
FIG. 8 is an isometric view of additional selected components according to one or more examples of the present specification.

Referring now to FIG. 8, illustrated therein is another perspective view of selected components, including the engine 302 and forward firewall 308, showing additional details of certain features of the present specification. As previously noted, a drive shaft 314 of the engine 302 extends through an inlet plenum 312 of the firewall 308. As previously noted, the RGB 316 provides reduction gearing to driveshaft assembly 314.

As shown in FIG. 8, and as previously indicated, in accordance with embodiments described herein, a flexible seal component 320 is integrated into the forward firewall 308. The flexible seal component 320 is configured so as to accommodate movement of the engine 302 relative to the inlet aperture 310 and may be fabricated of neoprene having fiberglass cloth embedded therein and/or silica and/or other flexible fireproof material(s). As will be shown and described in greater detail with reference to FIG. 9 below, a bellmouth (or, more generally, engine air inlet duct) of the engine 302 may include an integral flange feature that connects directly to the engine interface and creates an air path to the inlet plenum.

Figure 9:
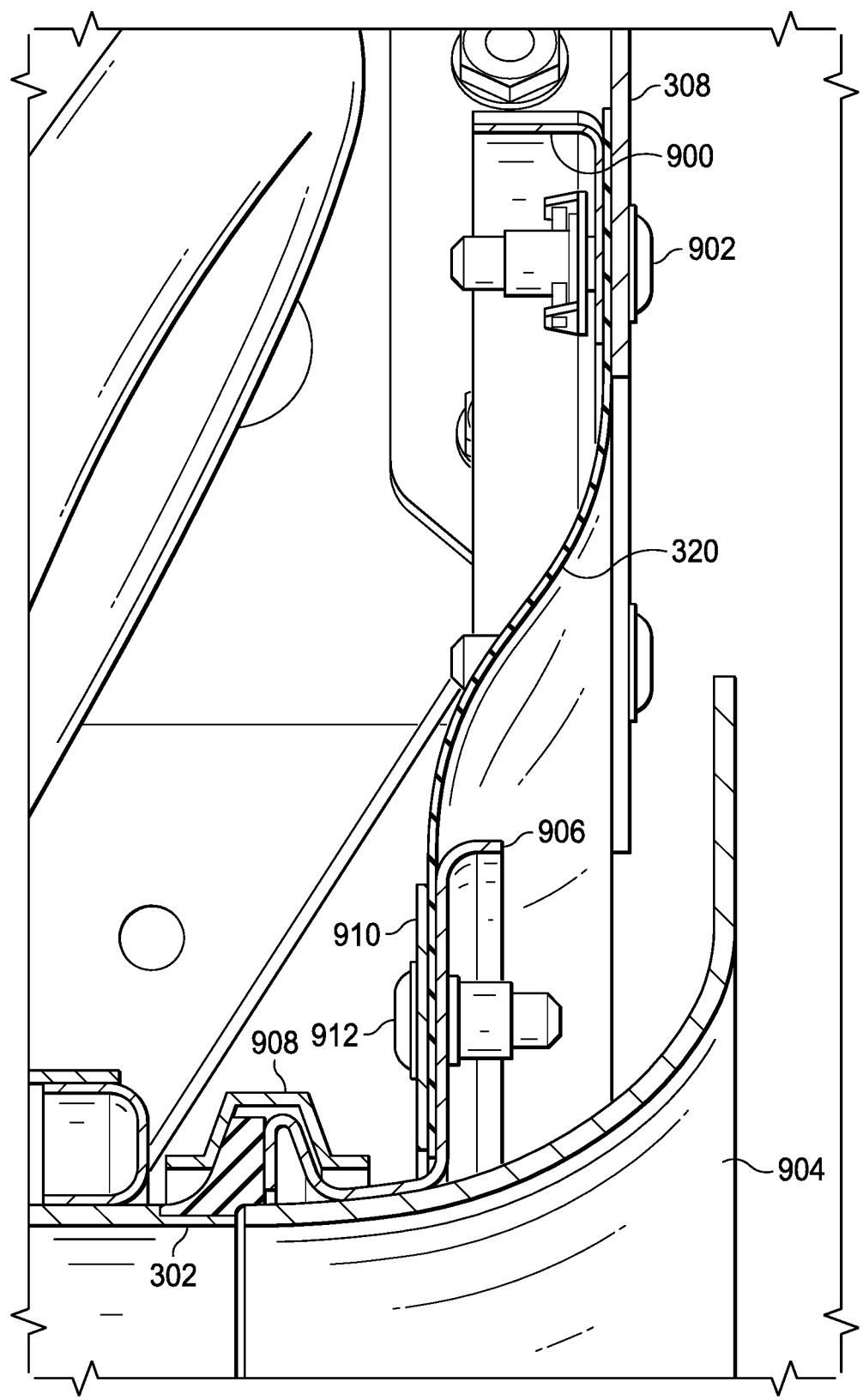
FIG. 9 is a section view of selected components of FIG. 8.

FIG. 9 illustrates a cutaway view of selected components of the present specification. As shown in FIG. 9, the seal 320 is connected to the firewall 308 by a firewall seal retainer 900 disposed around the inlet aperture 310 (FIG. 8). In the illustrated embodiment, the firewall seal retainer 900 may be attached to the firewall 308 by one or more bolts, represented in FIG. 9 by a bolt 902, for example, disposed around the periphery of the retainer 900. As previously noted, an engine bellmouth 904 may include an integral flange feature, which may be referred to as a bellmouth bracket, 906 attached to the engine 302 via a v-band clamp 908 to which the seal 320 is connected via a bellmouth seal retainer 910. The bellmouth seal retainer 910 may be attached to the bellmouth bracket 906 via one or more bolts, represented in FIG. 9 by a bolt 912, for example, disposed around the periphery of the bellmouth bracket 906. In one embodiment, the diameter of the inlet aperture 310 is approximately 19.5 inches, while the diameter of the diameter of the engine inlet duct at the plane where inlet aperture 310 exists is approximately 13.25 inches, providing approximately 3 inches of radial clearance between the dynamic engine assembly and the fixed firewall structure. In certain embodiments, the engine side of the seal and the firewall side of the seal are offset to increase the flexibility of the seal system to allow radial and axial movement of the engine relative to the airframe.

The embodiments described throughout this disclosure provide numerous technical advantages, including by way of example, the ability to detach a portion of the forward firewall and inlet plenum wall during servicing of a rotary aircraft. This enables removal of the engine without the need to disengage the driveshaft assembly and RGB assembly.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An inlet plenum assembly for a rotary aircraft, comprising:
   an inlet plenum defined on a first side by an inlet plenum wall and on a second side by a forward firewall assembly, the forward firewall assembly having an inlet aperture configured to receive a drive shaft to rotatably coupled to an engine; and
   a seal connected to the forward firewall assembly via a seal retainer disposed around a periphery of the inlet aperture;
   wherein the forward firewall assembly comprises a forward firewall upper portion and a forward firewall lower portion, the forward firewall upper portion configured to removably seat to the forward firewall lower portion.

2. The inlet plenum assembly of claim 1, wherein the seal retainer is attached to the forward firewall assembly via a plurality of bolts disposed around the periphery of the seal retainer.

3. The inlet plenum assembly of claim 1, wherein the seal is connected to an inlet duct of the engine.

4. The inlet plenum assembly of claim 3, wherein the engine inlet duct comprises a bellmouth.

5. The inlet plenum assembly of claim 3, wherein the engine inlet duct comprises an integral flange feature to which the seal is connected.

6. The inlet plenum assembly of claim 5, wherein the seal is connected to the integral flange feature via a seal retainer attached to the integral flange feature via a plurality of bolts disposed around a periphery of the integral flange feature.

7. The inlet plenum assembly of claim 1, wherein a diameter of the inlet aperture is greater than a diameter of the engine inlet duct to provide a radial clearance between the engine and the firewall assembly.

8. The inlet plenum assembly of claim 1, wherein a side of the seal to which the engine is attached and a side of the seal opposite the side of the seal to which the engine is attached are offset from one another to accommodate radial and axial movement of the engine relative to an airframe in which the engine is disposed.

9. The inlet plenum of claim 1, wherein the seal is constructed of a flexible fireproof material.

10. A rotary aircraft, comprising:
    an airframe;
    an engine disposed within the airframe;
    a driveshaft rotatably coupled to the engine;
    an inlet plenum defined on a first side by an inlet plenum wall and on a second side by a forward firewall assembly, the forward firewall assembly having an inlet aperture configured to receive the drive shaft; and
    a seal connected to the forward firewall assembly via a seal retainer disposed around a periphery of the inlet aperture;
    wherein the forward firewall assembly comprises a forward firewall upper portion and a forward firewall lower portion, the forward firewall upper portion configured to removably seat to the forward firewall lower portion.

11. The rotary aircraft of claim 10, wherein the seal retainer is attached to the forward firewall assembly via a plurality of bolts disposed around the periphery of the seal retainer.

12. The rotary aircraft of claim 10, wherein the seal is connected to an inlet duct of the engine.

13. The rotary aircraft of claim 10, wherein a diameter of the inlet aperture is greater than a diameter of the engine inlet duct to provide a radial clearance between the engine and the firewall assembly.

14. The rotary aircraft of claim 10, wherein the seal is constructed of a flexible fireproof material.

15. A firewall for an inlet plenum assembly comprising:
    a firewall upper portion and a firewall lower portion, the firewall upper portion configured to removably seat to the firewall lower portion;
    an inlet aperture configured to receive a drive shaft to rotatably coupled to an engine; and
    a flexible fireproof seal connected to the firewall via a seal retainer disposed around a periphery of the inlet aperture.

16. The firewall of claim 15, wherein the seal is connected to an inlet duct of the engine.

17. The firewall of claim 16, wherein the engine inlet duct comprises an integral flange feature to which the seal is connected.

18. The firewall of claim 15, wherein a diameter of the inlet aperture is greater than a diameter of the engine inlet duct to provide a radial clearance between the engine and the firewall.

* * * * *